Jan. 26, 1960 L. A. RUSSELL 2,922,899

TRANSISTOR CONTROL CIRCUIT

Filed May 15, 1956

INVENTOR.
LOUIS A. RUSSELL

BY William V. Schilberg

AGENT

United States Patent Office 2,922,899

Patented Jan. 26, 1960

2,922,899

TRANSISTOR CONTROL CIRCUIT

Louis A. Russell, Poughkeepsie, N.Y., assignor to International Business Machines Corporation, New York, N.Y., a corporation of New York Application May 15, 1956, Serial No. 585,012

2 Claims. (Cl. 307—88.5)

This invention relates to transistor devices and more particularly to a circuit arangement employing a low power, high impedance signal source for controlling the operation of such devices to function as a pulse generator.

Certain transistor amplifiers have been designed that are capable of delivering considerable amounts of power, however, their action is similar to that of a thyratron discharge device and some means is required for controlling the turn on and turn off time to operate such devices as a pulse generator and provide output impulses of regulated duration. A transistor of this kind is described and claimed in the copending patent application, serial number 458,619, filed September 27, 1954, Patent No. 2,889,499 issued June 2, 1959, on behalf of Richard F. Rutz, and it is with such transistor devices that the circuit arrangement of this invention is adapted to be used.

In accordance with the invention, a bistable magnetic core is provided having windings connected with certain electrodes of a transistor in such a manner that a flux change therein develops a voltage opposed to the bias voltage normally applied to one of the electrodes during the period that the core switches from one remanence state to the other and allows the transistor to turn on, with the windings on the core functioning to present a variable impedance to the flow of current through the transistor to turn the transistor off. In this manner the transistor is maintained in a state of high conductivity only for an interval of time required for the core to shift remanence state and an output pulse of predetermined duration is developed.

Accordingly, a broad object of the invention is to provide a high impedance signal source for controlling the operation of a transistor amplifier device.

A more specific object is to provide a control circuit for transistor devices whereby the period of conduction may be regulated to a predetermined interval.

Another object of the invention is to provide a bistable magnetic core input control circuit for a thyratron type transistor wherein the period of conduction of the transistor is regulated by the switching time of the magnetic core material to generate pulses of predetermined duration.

Other objects of the invention will be pointed out in the following description and claims and illustrated in the accompanying drawings, which disclose, by way of example, the principle of the invention and the best mode, which has been contemplated, of applying that principle.

A transistor device of the type described in the aforementioned application may comprise a body of semi-conductor material having a P-N junction with a electrode coupled to the surface of the P type region by an ohmic contact, an electrode connected to the N type region by a further ohmic contact and a collector electrode making point contact with the N type region. When operated in a manner such that the PN junction serves as the emitter with a positive potential applied to the ohmic contact of the N type region, which serves as the base electrode, an extremely high collector current is attained with action similar to that of a thyratron. Under these conditions the N region is held more positive than the P region so that the PN junction barrier is reverse biased and contributes no hole current, with the only current flowing to the collector circuit supplied by the base. A negative signal applied to the base may change this potential relationship by pulling the N region negative with respect to the P region whereupon holes are emitted from the PN-junction and travel to the collector electrode where an internal positive feedback condition is initiated due to the amplification factor of the collector and causes a large collector current to be established. The reverse bias on the junction barrier as described may also be overcome by an increase in the negative collector bias potential which causes holes to be injected by the P region with the internal positive feedback action taking place and causing an increase in collector current.

In order to return the transistor to a low collector current state, it is necessary to reduce the injection of holes at least momentarily to a point where the positive feedback due to the intrinsic alpha of the point contact collector is interrupted and the reverse bias on the PN barrier is re-established. This cut off operation may be accomplished by reducing the collector potential and increasing the reverse bias.

Figure 1:
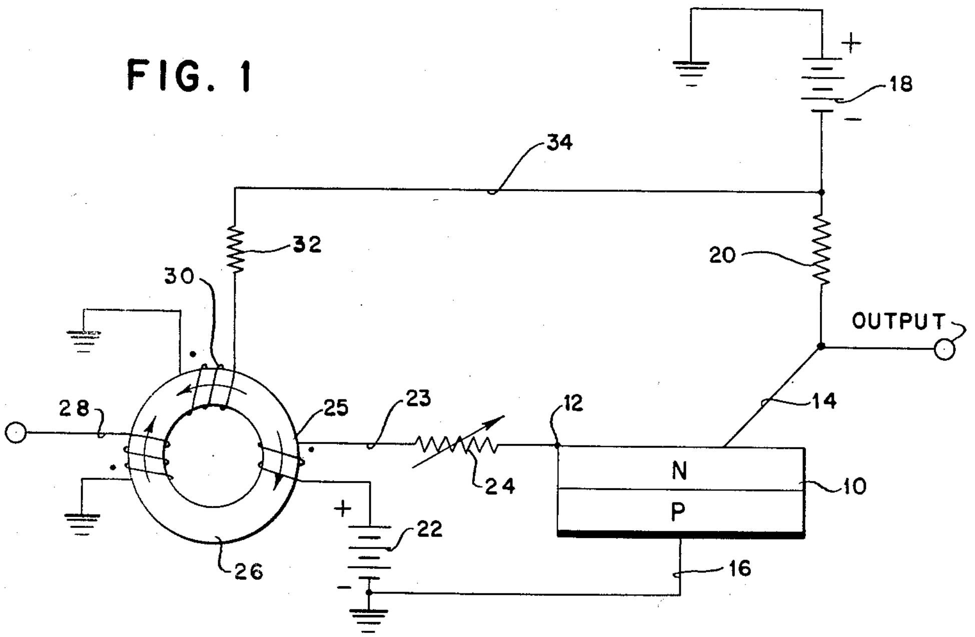
Figure 1 is a schematic illustration of a transistor control circuit constructed according to the principle of the invention.

An arrangement for applying such controlling signals to the electrodes of a transistor of the type described is shown in Figure 1 where a transistor 10 is illustrated having the aforementioned N and P type conductivity regions with the base, collector and emitter electrodes designated as elements 12, 14 and 16 respectively. The emitter electrode 16 is connected to ground, the collector electrode 14 is connected to a negative bias source 18 through a resistor 20 and the base electrode 12 is coupled to a positive bias source 22 through lead 23 and resistor 24 to a winding 25 of a magnetic core 26. The core 26 is provided with a winding 28, adapted to receive an input signal of short duration to initiate operation of the circuit, and a winding 30 having one terminal connected to ground and the other connected to the source 18 through a resistor 32 and lead 34.

Each of the windings 25, 28 and 30 have a dot marking adjacent one end that serves to identify the polarity sense of the winding with the dot marked end having a positive polarity during a change in remanence state from one condition of remanent flux density to the opposite condition which is taken as a datum state.

Figure 2:
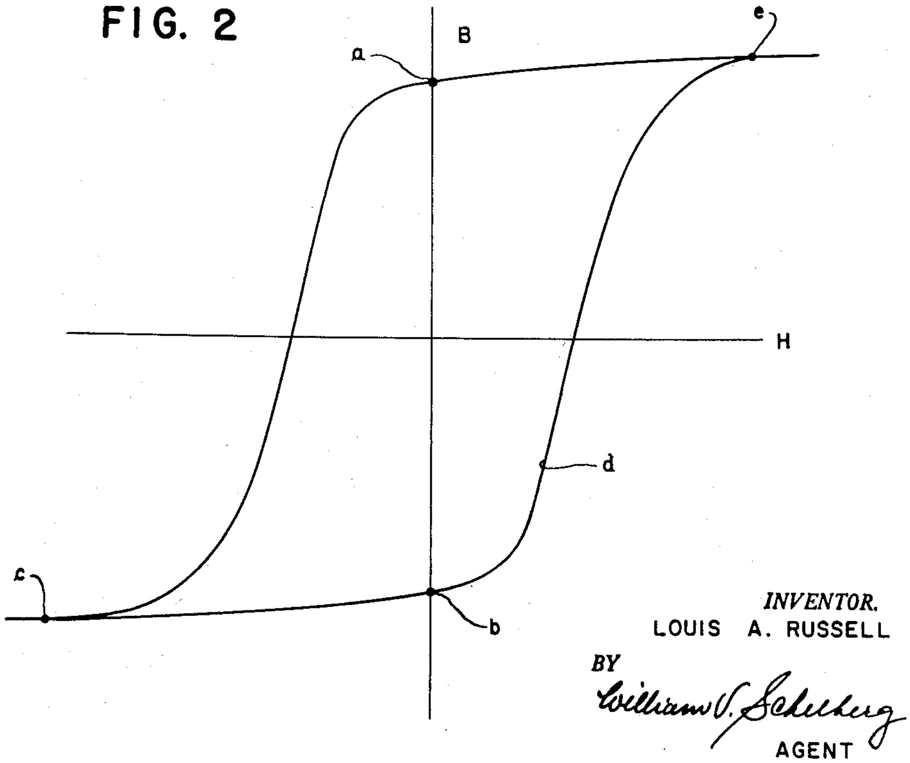
Figure 2 is a representation of the hysteresis characteristic of a magnetic material of the type employed for the magnetic core device in the circuit of Figure 1.

Referring to Figure 2, a hysteresis characteristic is shown for a magnetic material of the type employed for the core 26. On this diagram, points *a* and *b* represent the opposite remanence flux density directions and it is assumed that point *a* represents a clockwise flux direction around the core so that point *b* represents a counterclockwise direction which is taken as the datum state.

In the quiescent state of the transistor circuit, current flow is maintained from the grounded or positive terminal of the source 18 through the winding 30, resistor 32, and the lead 34 and, being directed into the dot marked terminal, tends to establish flux in the core in a counterclockwise sense and biases the core to point *c* as shown on the loop in Figure 2. Some current also flows from the positive terminal of the source 22 through the winding 25 and lead 23 to the transistor base and, while the sense of the winding 25 is opposed to that of the winding 30, the effect of this base current flow is small as the current is of low magnitude.

The transistor is turned on to develop a pulse of predetermined duration by application of a signal to the winding 28 which causes the core to be driven from the biased point "c" toward and beyond the knee of the curve as at point *d*. As the core begins to switch in this initial action, the flux change causes the dot marked terminal of winding 25 to go more negative and lower the potential of the transistor base electrode 12 substantially to ground level or the voltage of the emitter 16. When this condition is attained and the bias of battery 22 is overcome, the NP barrier is no longer reverse biased and holes are injected so that the transistor turns on to a high state of conductivity. A considerable current flow now takes place from source 22 through the winding 25 and the core 26 is driven to point *e* against the bias current flow in winding 30. As the state *e* is attained, however, the impedance of the winding 25, which is high during the switching period when a large flux change takes place, reduces to substantially zero so that the full positive voltage of the battery 22 is again applied to the transistor base 12 to provide a reverse bias to the PN junction, causing the transistor to turn off. The current flow into the dot marked end of the winding 30 and through the resistor 32 now tends to switch the core from point *e* through point *a* and back to point *c* with the transistor base 12 rendered more positive by the voltage developed across winding 25 during this reset as this voltage is now additive with respect to the bias from source 22.

The transistor 10 is turned on only for the interval of time required for the core to switch from state *c* to state *e* and, since this is controllable by the particular core material employed, by the turns of the windings and by the current flow through the winding 25, which may be regulated by the variable resistor 24 as shown, the interval may be varied to provide for generation of output pulses of desired length.

In a specific embodiment, the core 26 may be formed of forty wraps of one eight inch wide and one quarter mil thick 4–79 mo-permalloy tape wound with an inside diameter of 5⁄16 inch. Windings 25, 28 and 30 may comprise 20, 40 and 10 turns, respectively, with resistors 32 and 20 having magnitudes of 1000 and 620 ohms and sources 18 and 22 having potentials of −40 and +7 volts. It should be understood, however, that specific values are given here merely in the interest of providing a complete disclosure of an operative embodiment as the values of the components and the core material used may be varied within wide limits.

The arrangement disclosed provides a unique and stable mode of control for a thyratron type transistor to adapt such a solid state amplifier element as a pulse generating means for control of other apparatus such as a selection line of a core array or similar load device as used in computer circuitry.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. In a control circuit for a transistor having an emitter, point contact collector and ohmic base contacts, means for biasing said collector, means for reverse biasing said emitter including a bias source coupled between said emitter and base contacts and including a variable resistor and a winding on a saturable magnetic core, means for maintaining said core in one direction of flux density, and input means comprising a further winding on said core for causing said core to shift to the other direction of flux density whereupon a voltage is developed across said winding in opposition to said bias source whereupon said transistor assumes a high conductivity state during the interval that said core switches states.

2. In a control circuit for a transistor having emitter, collector and base electrodes, a magnetic core, input, bias and control windings on said core, a first voltage source coupled to the collector electrode of said transistor through a resistor element and to the bias winding of said core through a further resistor element, a second voltage source coupled between said base and emitter electrodes through circuit means including said control winding, said second voltage source being poled to reverse bias said emitter and normally maintain said transistor in a non-conductive state and said control winding being poled to oppose said second voltage source when said input winding is energized.

References Cited in the file of this patent

UNITED STATES PATENTS

| | | |
|---|---|---|
| 2,695,993 | Haynes | Nov. 30, 1954 |
| 2,717,342 | Pfann | Sept. 6, 1955 |
| 2,760,087 | Felker | Aug. 21, 1956 |
| 2,760,088 | Pittman et al. | Aug. 21, 1956 |
| 2,783,384 | Bright et al. | Feb. 6, 1957 |